United States Patent
Dafesh et al.

(10) Patent No.: US 10,491,251 B1
(45) Date of Patent: Nov. 26, 2019

(54) SUPPRESSING INTERFERENCE IN BINARY OFFSET CARRIER MODULATED SIGNALS

(71) Applicant: The Aerospace Corporation, El Segundo, CA (US)

(72) Inventors: Philip A. Dafesh, Manhattan Beach, CA (US); Phillip B. Hess, Venice, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 16/210,991

(22) Filed: Dec. 5, 2018

(51) Int. Cl.
*H04B 1/10* (2006.01)

(52) U.S. Cl.
CPC ... *H04B 1/1027* (2013.01); *H04B 2001/1072* (2013.01)

(58) Field of Classification Search
CPC ...... H04B 1/1027; H04B 1/7176; H04B 1/30; H04L 25/061; H04W 16/26; H04W 4/021; H04W 16/32; H04W 24/10; H04N 5/16

See application file for complete search history.

(56) References Cited

U.S. PATENT DOCUMENTS

| | | | |
|---|---|---|---|
| 5,263,048 A | | 11/1993 | Wade |
| 5,493,343 A | * | 2/1996 | Knutson ............... H04N 5/211 348/691 |
| 9,197,360 B2 | | 11/2015 | Wyckoff |
| 9,391,654 B2 | | 7/2016 | Wyckoff et al. |
| 9,654,158 B2 | | 5/2017 | Dafesh et al. |
| 9,923,598 B2 | | 3/2018 | Dafesh et al. |
| 2007/0274374 A1 | * | 11/2007 | Abraham ............... G01S 19/30 375/148 |
| 2008/0262726 A1 | * | 10/2008 | Hoult .................... H04B 1/707 701/469 |
| 2011/0075774 A1 | * | 3/2011 | Hiben ................. H04B 1/1027 375/350 |

* cited by examiner

*Primary Examiner* — Thanh C Le
(74) *Attorney, Agent, or Firm* — Jones Day

(57) ABSTRACT

Circuits and methods are described herein for suppressing interference in binary offset carrier (BOC) modulated signals The BOC signal includes an upper sideband (USB) and a lower sideband (LSB). The LSB or the USB of the BOC signal is rotated from a first frequency to a second frequency. Interference in the rotated LSB or USB is reduced. An output BOC signal with reduced interference is generated based on the rotated LSB or USB from which interference has been reduced.

20 Claims, 10 Drawing Sheets

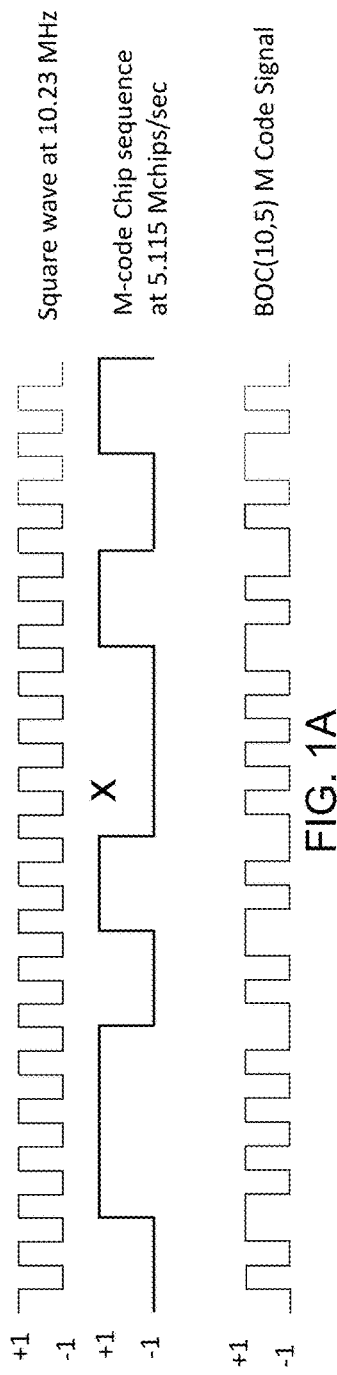
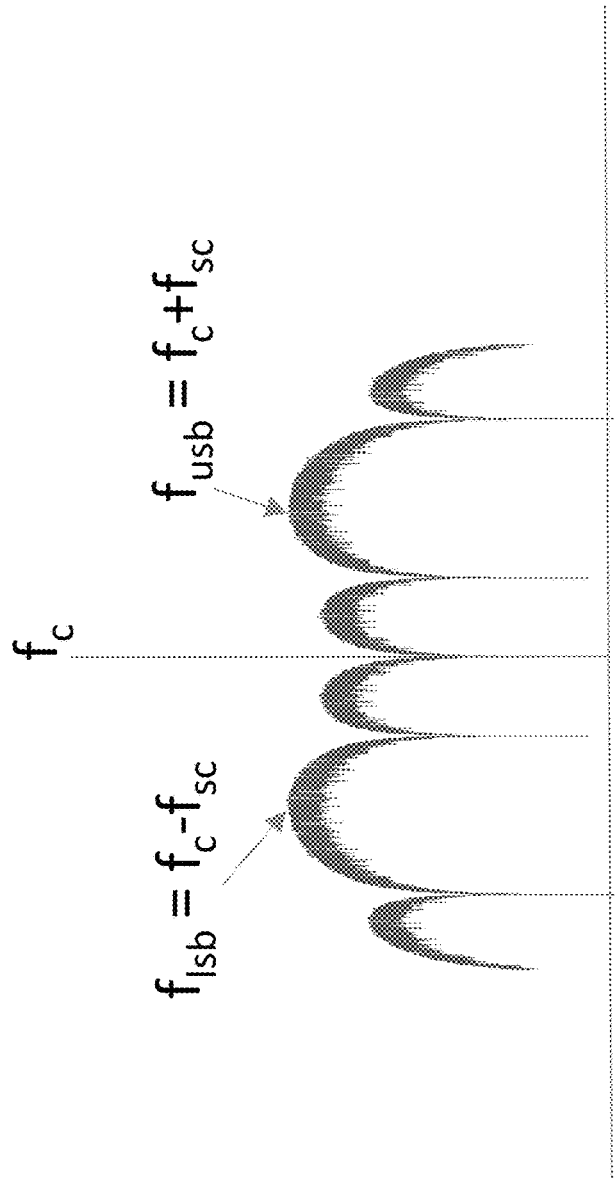
FIG. 1A
FIG. 1B

SUPPRESSING INTERFERENCE IN BINARY OFFSET CARRIER MODULATED SIGNALS

FIELD

This application relates to circuits and methods for reducing an interference signal that spectrally overlaps with a desired signal.

BACKGROUND

Strong interference has become a common problem as the radio spectrum has become more crowded. Constant envelope, or approximately constant envelope signals are popular because such waveforms are compatible with non-linear amplifiers which can be more energy efficient than linear amplifiers. Examples of constant envelope signals include: frequency modulation, frequency shift keying, minimum shift keying, Gaussian minimum shift keying, multi-h continuous phase frequency modulation, linear FM, continuous wave, and many frequency hopping signals. Any of these types of constant envelope signals can cause interference with other, desired signals, particularly where the desired signal and the constant envelope signal spectrally overlap with one another. Non-constant envelope interference also can be problematic, both with constant envelope signals and non-constant envelope signals with which the interference overlaps. Interference from sources other than the desired source can be intentional or inadvertent.

Thus, what is needed are improved circuits and methods for reducing interference that spectrally overlaps a desired signal.

SUMMARY

Configurations of the presently disclosed subject matter provide circuits and methods for suppressing interference in Binary Offset Carrier (BOC) modulated signals.

In one aspect, the BOC signal includes an upper sideband (USB) and a lower sideband (LSB). Reducing interference in a received BOC signal includes rotating the LSB or the USB of the BOC signal from a first frequency to a second frequency. The interference is reduced in the rotated LSB or USB after it has been processed with an interference mitigation technique. An output BOC signal with reduced interference is generated based on the rotated LSB or USB from which interference has been reduced.

In some variations, the LSB or USB can be rotated from which interference has been reduced from the second frequency to the first frequency. The output BOC signal with reduced interference is generated based on the rotated LSB or USB at the first frequency.

In other variations, the other of the LSB or USB of the BOC signal can be rotated from a third frequency to a fourth frequency. Interference can be reduced in the rotated other of the LSB or USB. The output BOC signal with reduced interference can be further generated based on the rotated other of the LSB or USB.

In some variations, the LSB or USB can be rotated from which interference has been reduced from the second frequency to the first frequency. The other of the LSB or USB can be rotated from which interference has been reduced from the fourth frequency to the third frequency. The output BOC signal with reduced interference can be based on a combination of the rotated LSB or USB at the first frequency from which interference has been reduced and the rotated other of the LSB or USB at the third frequency from which interference has been reduced.

In other variations, the first and second frequencies can differ by a subcarrier frequency of the BOC signal.

In some variations, the second frequency can be a baseband frequency of the BOC signal.

In other variations, reducing interference in the rotated LSB or USB can include applying an interference mitigation algorithm to the rotated LSB or USB. Reducing interference in the rotated LSB or USB can further include filtering the rotated LSB or USB before applying the interference mitigation algorithm.

In another aspect, a circuit reduces interference in a received BOC signal. The circuit includes a first sideband rotation circuit configured to receive and to rotate the LSB or the USB of the BOC signal from a first frequency to a second frequency, a first interference suppression circuit coupled to the first sideband rotation circuit and configured to receive and to reduce interference in the rotated LSB or USB, and an output configured to generate a BOC signal with reduced interference based on the rotated LSB or USB from which interference has been reduced.

In some variations, the circuit can include a second sideband rotation circuit configured to receive and rotate the LSB or USB from which interference has been reduced from the second frequency to the first frequency. The output can be configured to generate the BOC signal with reduced interference based on the rotated LSB or USB at the first frequency.

In other variations, the circuit can include a second sideband rotation circuit configured to receive and rotate the other of the LSB or USB of the BOC signal from a third frequency to a fourth frequency and a second interference suppression circuit coupled to the second sideband rotation circuit and configured to receive and to reduce interference in the rotated other of the LSB or USB. The output can be configured to generate the BOC signal with reduced interference further based on the rotated other of the LSB or USB. The circuit can also include a third sideband rotation circuit configured to receive and rotate the LSB or USB from which interference has been reduced from the second frequency to the first frequency and a fourth sideband rotation circuit configured to receive and rotate the other of the LSB or USB from which interference has been reduced from the fourth frequency to the third frequency. The output can be configured to generate the BOC signal with reduced interference further based on a combination of the rotated LSB or USB at the first frequency from which interference has been reduced and the rotated other of the LSB or USB at the third frequency from which interference has been reduced.

In some variations, the first and second frequencies can differ by a subcarrier frequency of the BOC signal.

In other variations, the second frequency can be a baseband frequency of the BOC signal.

In some variations, the first interference suppression circuit can be configured to apply an interference mitigation algorithm to the rotated LSB or USB.

In other variations, the first interference suppression circuit can be further configured to filter the rotated LSB or USB before applying the interference mitigation algorithm.

In yet another aspect, a method for reducing interference in a received BOC signal includes rotating the USB of the BOC signal downward from a first frequency to a second frequency. The LSB of the BOC signal is rotated upward from a third frequency to a fourth frequency. The interference is reduced in the rotated USB and rotated LSB. The USB is rotated from which interference has been reduced upward from the second frequency to the first frequency. The LSB is rotated from which interference has been reduced downward from the fourth frequency to the third frequency. The rotated USB and LSB are combined from which interference has been reduced to generate an output BOC signal with reduced interference.

In some variations, the second frequency and the fourth frequency can be a baseband frequency of the BOC signal.

In another aspect, a circuit for reducing interference in a received BOC signal includes a first sideband rotation circuit configured to receive and to rotate the USB of the BOC signal downward from a first frequency to a second frequency, a second sideband rotation circuit configured to receive and to rotate the LSB of the BOC signal upward from a third frequency to a fourth frequency, a first interference suppression circuit coupled to the first sideband rotation circuit and configured to receive and to reduce interference in the rotated USB, a second interference suppression circuit coupled to the second sideband rotation circuit and configured to receive and to reduce interference in the rotated LSB, a third sideband rotation circuit coupled to the first interference suppression circuit and configured to receive and to rotate the USB from which interference has been reduced upward from the second frequency to the first frequency, a fourth sideband rotation circuit coupled to the second interference suppression circuit and configured to receive and to rotate the LSB from which interference has been reduced downward from the fourth frequency to the third frequency, and a signal construction circuit coupled to the third and fourth sideband rotation circuits and configured to receive and combine the rotated USB and LSB from which interference has been reduced to generate an output BOC signal with reduced interference.

BRIEF DESCRIPTION OF THE DRAWINGS

FIG. 1A illustrates the signal components of an exemplary BOC signal in the time domain.

FIG. 1B illustrates the spectrum of an exemplary BOC signal in the frequency domain.

DETAILED DESCRIPTION

Figure 2A:
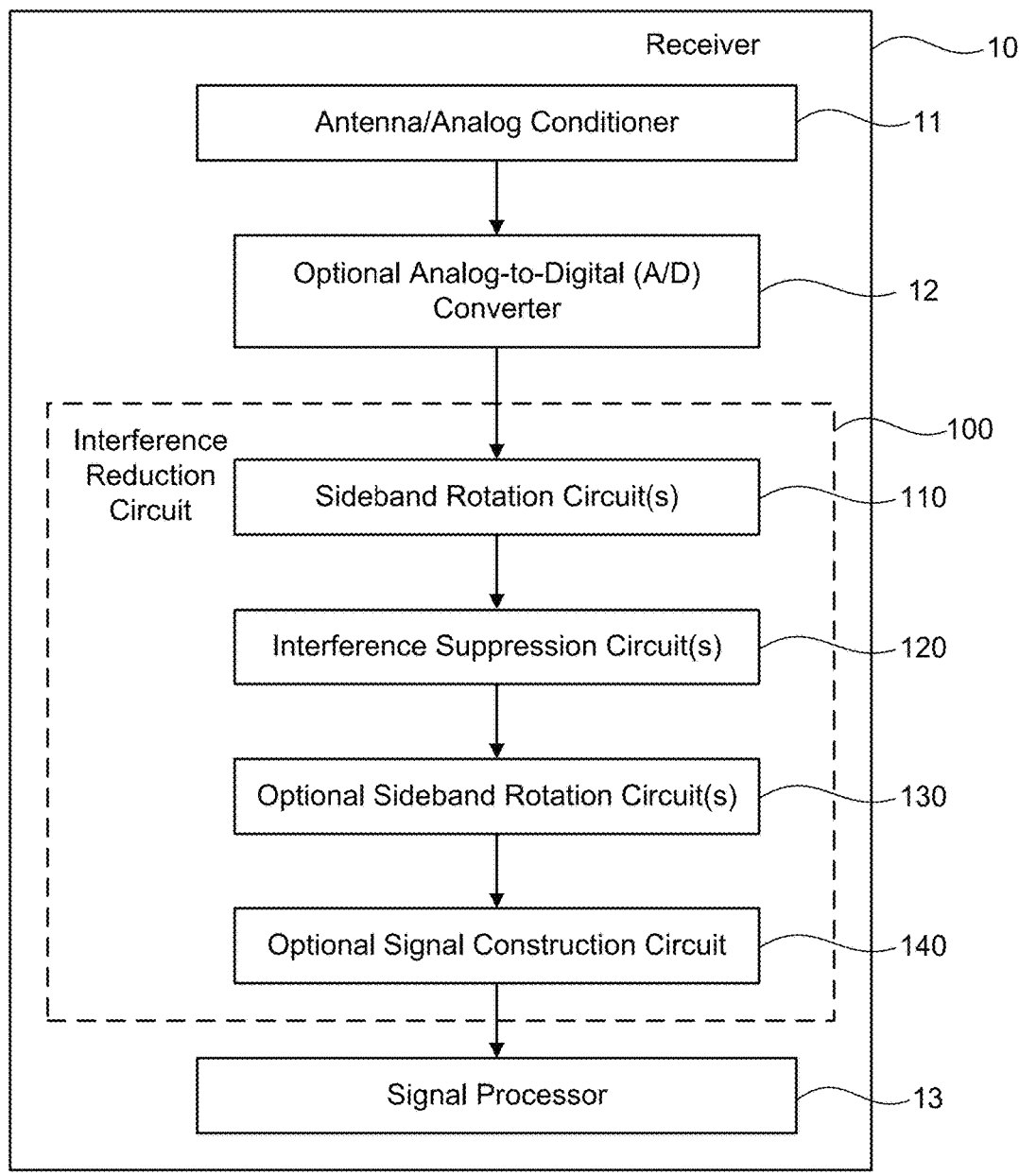
FIG. 2A schematically illustrates a circuit for reducing an interference signal that spectrally overlaps a desired BOC signal in a receiver, according to some configurations provided herein.

Configurations of the presently disclosed subject matter provide circuits and methods for suppressing interference in Binary Offset Carrier (BOC) signals. For example, in a received signal that includes a BOC signal and interference that spectrally overlaps the BOC signal (sometimes referred to as matched spectral interference), the amplitude of the interference can vary relatively quickly relative to the amplitude of the BOC signal, impeding its mitigation using previously known techniques. The presently disclosed subject matter can transform such a received signal into a domain in which the interference amplitude is constant, or slowly varying, by rotating upper and lower sidebands of the received signal to zero or near-zero frequency using an estimate of the received BOC signal's subcarrier value. After such sideband rotation, any suitable interference mitigation technique can be used so as to reduce the interference, e.g., a technique that can be used for a desired signal having constant, approximately constant, or slowly varying amplitude.

Some modernized signals, such as navigation signals, employ a BOC signal modulation in which a spreading code at a baseband frequency $f_c$ is modulated by a square-wave subcarrier at frequency $f_{sc}$. Such signals can be referred to as BOC(n,m) where n×1.023 MHz is the square-wave subcarrier frequency and m×1.023 Mchips/sec is the code chip rate. The BOC signal can be the product of these two sequences, and it can be assumed that the sequences are non-return to zero encoded such that a code bit (chip) of one is encoded as a −1 and a code bit (chip) of 0 is encoded as a +1. For example, FIG. 1A illustrates the signal components of an exemplary BOC signal in the time domain. In the nonlimiting example illustrated in FIG. 1A, the spreading code, referred to as an M-code chip sequence, has a code chip rate of 5.115 Mchips/second; the square-wave subcarrier has a frequency of 10.23 MHz; and the product of the spreading code and the square-wave subcarrier is a BOC signal, referred to as a BOC(10,5) M code signal.

As can be understood from FIG. 1A, the square-wave can be thought of as providing a high frequency amplitude modulation to the spreading code. In the frequency domain, this square-wave subcarrier shifts the spectrum of the 5.115 Mchips/second (MCPS) M code chip sequence above and below the baseband frequency. The portion of the signal spectrum at the lower frequency can be referred to as the lower sideband (LSB), and can be centered at the frequency $f_{LSB}=f_c-f_{sc}$, where $f_c$ is the baseband (carrier) frequency and $f_{sc}$ is the frequency of the square-wave subcarrier. Similarly, the portion of the signal spectrum at the higher frequency can be referred to as the upper sideband (USB), and can be centered at the frequency $f_{USB}=f_c+f_{sc}$. For example, FIG. 1B illustrates the spectrum of an exemplary BOC signal in the frequency domain. In FIG. 1B, peaks corresponding to the LSB and USB can be seen to be symmetrically arranged about the baseband frequency $f_c$, and spaced apart from the baseband frequency by $\pm f_{sc}$.

BOC ranging signals are used in modernized US and foreign satellite navigation systems and augmentations such as GPS, Galileo, QZSS, Compass, and BeiDou. As such, it is desirable that navigation receivers can process some or all of such signals. However, interference signals (such as jammer signals) can have interference that is matched to that of the signal of interest, e.g., the BOC signal (such as a BOC ranging signal). An exemplary matched spectral jammer can have a pseudorandom noise code spreading waveform that has the same square-wave modulation as the desired BOC signal, having a different spreading code. Additionally, when BOC modulations are filtered in a band limited receiver, the previously constant envelope square-wave modulation can become a sine wave modulation. In this case, the BOC modulation produces a high frequency amplitude modulated (AM) signal. Therefore, a matched spectral interference signal that also uses BOC modulation can appear as non-constant rapidly varying AM-modulated interference in such a receiver.

Previously known techniques for mitigating the effects of relatively strong interference signals on a relatively weak signal of interest can be effective for interference signals that have an approximately constant or relatively slowly varying amplitude or envelope. An exemplary technique that is widely used in civilian and military receivers applies adaptive quantization to mitigate interference that has an approximately constant envelope or amplitude is described in Amoroso, "Adaptive A/D Converter to Suppress CW Interference in DSPN Spread-Spectrum Communications," IEEE Transactions on Communications, Vol. Com 31, No. 10 (October 1983). Techniques such the Amoroso method can severely degrade or fail if attempting to mitigate interference that varies relatively quickly, as does matched spectral interference with a BOC signal, e.g., interference at a similar or same frequency as the high frequency square-wave BOC subcarrier. Other exemplary techniques include reducing interference signals that spectrally overlap desired signals, such as disclosed by U.S. Pat. No. 9,391,654 to Wyckoff et al., U.S. Pat. No. 9,654,158 to Dafesh et al., and U.S. Pat. No. 9,923,598 to Dafesh et al.

In some configurations of the present circuits and methods, the effect of interference that spectrally overlaps the BOC signal, e.g., at or near the frequency of the BOC subcarrier, can be countered by rotating each of the LSB and USB to a central frequency, e.g., to $f_c$, performing interference suppression (e.g., anti jam processing) on the rotated LSB and USB, and then rotating the LSB and USB back to their original frequencies for further processing by the receiver. For example, FIG. 2A schematically illustrates a circuit for reducing an interference signal that spectrally overlaps a desired BOC signal in a receiver, according to some configurations provided herein. As illustrated in FIG. 2A, receiver 10 can include an antenna/analog conditioner 11 configured to receive a signal that includes the interference signal and the desired BOC signal that can include an LSB and USB; optional analog-to-digital (A/D) converter 12; signal processor 13 configured to process the received signals in order to perform conventional receiver functions such as synchronization, demodulation, decoding and other functions; and interference reduction circuit 100 disposed therebetween. In alternate configurations, a second interference reduction circuit may be present before or after the first interference reduction circuit. For example, a narrow band frequency excision circuit may process the signal before the interference reduction circuit shown in FIG. 2A. An exemplary narrow band frequency excision circuit is described in U.S. Pat. No. 5,263,048. In some embodiments, the first and/or second interference reduction circuits can be implemented in the same device as the signal processor. In other examples, the first and/or second interference reduction circuits can be implemented in separate devices on a printed circuit board or similar arrangement.

In the illustrated configuration, interference reduction circuit 100 includes one or more first sideband rotation circuit(s) 110 respectively connected to A/D converter 112; one or more interference suppression circuit(s) 120 coupled to respective sideband rotation circuit(s) 110; one or more optional second sideband rotation circuit(s) 130 coupled to respective interference suppression circuit(s) 120; and optional signal construction circuit 140 coupled to optional sideband rotation circuit(s) 130 and coupled to signal processor 13. Signal processor 13 can be implemented using digital or analog circuitry. Note that in configurations that exclude A/D converter 12, antenna/analog conditioner 11 instead suitably can be connected to first sideband rotation circuit(s) 110. In such configurations, first sideband rotation circuit(s) 110, interference suppression circuit(s) 120, optional second sideband rotation circuit(s) 130, and optional signal construction circuit 140 can be implemented using analog circuits. First sideband rotation circuit(s) 110, interference suppression circuit(s) 120, optional second sideband rotation circuit(s) 130, and optional signal construction circuit 140 also can be implemented in various combinations of analog and/or digital circuitry. Additionally, in configurations that exclude optional second sideband rotation circuit(s) 130 and optional signal construction circuit 140, interference suppression circuit 120 suitably can be connected to signal processor 13. Receiver 10 illustrated in FIG. 2A can include, but is not limited to, a global navigation satellite system receiver (GNSS) such as GPS, Glonass, Compass, or Galileo, a cellular wireless communications receiver, a WiFi, Bluetooth, or other radio frequency receiver, or a radar receiver or satellite communication system receiver. In some examples, the desired BOC signal is derived from a M code modulation, e.g., is a BOC(10,5) M code signal such as used in military receivers, or uses one of the L1C or Galileo code modulations such as BOC(2,2) or BOC(6,1) that are used as civilian receivers. In other examples, a desired BOC signal may be a BOC(15,2.5 signal) using the Galileo public regulated service (PRS) signal or a BOC(14,2) signal used in the BeiDou Navigation system.

Antenna/analog conditioner 11 illustrated in FIG. 2A can be configured to wirelessly receive a signal that includes the desired BOC signal and the interference signal that spectrally overlaps the desired signal (which interference can come from a different source than the desired BOC signal). The interference signal can have, but need not necessarily have, a greater power than that of the desired BOC signal. In some configurations, the power of the interference signal can be significantly larger than the desired signal, and can be anywhere from 10 times larger than the desired signal (10 dB) to 100,000,000 times larger than the desired signal (80 dB). In other configurations, the interference to signal power ratio can be greater than 100,000,000 (80 dB). In one example, antenna/analog conditioner 11 can be configured to receive the signal, which can fall within a pre-defined spectral band, and antenna/analog conditioner 11 can include one or more filters configured to block signals having frequencies that fall outside of this band. Appropriate antenna designs for a variety of signals in a variety of contexts, e.g., terrestrial, aircraft, or space-based antennas, are known in the art. In some configurations, antenna/analog conditioner 11 can be or include a pre-existing structure to which inventive circuit 100 can be coupled. Antenna/analog conditioner 11 also can include an input radio frequency (RF) filter to select the bandwidth containing desired signal components and reject other signals at frequencies outside of that bandwidth, a low noise amplifier to establish the system noise level, and can contain one or more downconverters to translate the RF bandwidth containing the user signals into the bandwidth over which the optional A/D converter 12 operates. Such components can be considered together to constitute analog conditioning circuitry.

Optional A/D converter 12 can include an input port configured to be coupled to antenna/analog conditioner 11 via a suitable element (not specifically illustrated), such that optional A/D converter 12 receives the signal received and suitably processed by antenna/analog conditioner 11. The element connecting antenna/analog conditioner 11 and optional A/D converter 12 can include a conductive element such as a coaxial cable, a transmission line, or any other suitable conductor configured to transmit signals within a pre-defined spectral band from antenna/analog conditioner 11 to A/D converter 12 via the input port. Note, however, that the element can include any path suitably configured to transmit the signal from antenna/analog conditioner 11 to A/D converter 12 and need not necessarily include a continuous conductor, e.g., the element can include a capacitor or transformer.

Optional A/D converter 12 is configured to digitize and quantize the signal that it receives from antenna/analog conditioner 11, and provide as output digitized samples of the signal. As known to those of skill in the art of digital signal processing, A/D converters are commercially available devices that generate a digital version of an analog signal by sampling that signal at a specified rate. Note that in some configurations, antenna/analog conditioner 11 can include its own A/D converter configured to digitize the received signal, or even can receive the signal in a digital format. In configurations including A/D converter 12, the A/D converter can provide the digitized samples as output to interference reduction circuit 100, e.g., to first sideband rotation circuit(s), via an output port and a suitable path (not specifically illustrated). In one exemplary configuration, antenna/analog conditioner 11 includes an analog quadrature downconverter, and A/D converter 12 includes two parallel A/D converters that are configured so as to provide digitized samples as output to interference reduction circuit 100.

Figure 3:
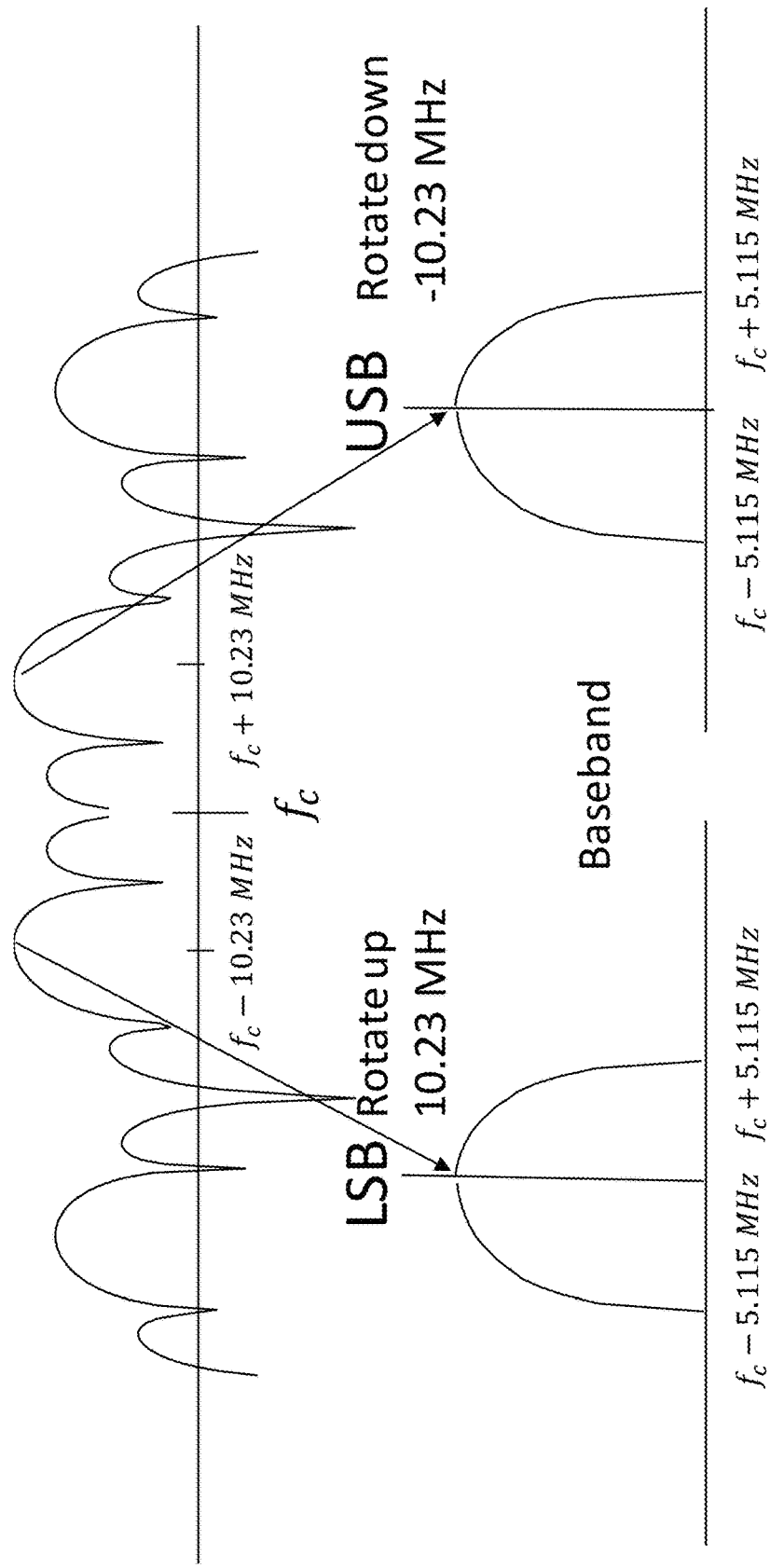
FIG. 3 illustrates rotation of USB and LSB of an exemplary BOC signal in the frequency domain, according to some configurations provided herein.

In the configuration illustrated in FIG. 2A, first sideband rotation circuit(s) 110 are configured to receive the signal from optional A/D converter 12 via an input port and any suitable path. Or, for example, first sideband rotation circuit(s) 110 can be configured to receive the signal from antenna/analog conditioner 11 via an input port and any suitable path. In embodiments where a second interference reduction circuit is present, such as the narrow band excision circuit in U.S. Pat. No. 5,263,048 to Wade, the first side band rotation circuit(s) 110 can be configured to receive the signal from output of the narrow band excision circuit. In analog implementations of the present circuits and methods, the A/D converter can be omitted and first sideband rotation circuit(s) 110 can be implemented using analog circuitry. First sideband rotation circuit(s) 110 can be configured to receive and to rotate the LSB or USB of the BOC signal from a first frequency to a second frequency. For example, the LSB can be at a first frequency such as $f_{LSB}=f_c-f_{sc}$, and can be rotated upward by $f_{sc}$ to a second frequency such as the baseband frequency $f_c$ using suitable analog or digital circuitry. Or, for example, the USB can be at a first frequency such as $f_{USB}=f_c+f_{sc}$, and can be rotated downward by $f_{sc}$ to a second frequency such as the baseband frequency $f_c$ using suitable analog or digital circuitry. An exemplary circuit that can perform such a rotation is a carrier rotation circuit found in digital receiver designs or upconverter/downconverter circuitry. In each of these cases, the circuits can be adjusted to isolate the USB and LSB portions of the signal by tuning the rotator to the USB or LSB frequency respectively or adapting the local oscillator of the upconverter to the LSB frequency for rotating the LSB to adapting the local oscillator to the USB for rotating the USB down. In some configurations, first sideband rotation circuit(s) 110 include a plurality of sideband rotation circuits, e.g., a circuit for rotating LSB from a first frequency (such as $f_{LSB}$) to a second frequency (such as $f_c$) and another circuit for rotating LSB from a third frequency (such as $f_{USB}$) to a fourth frequency (such as $f_c$). The second and fourth frequencies can be, but need not necessarily be, the same as one another. For example, FIG. 3 illustrates rotation of USB and LSB of an exemplary BOC signal in the frequency domain, according to some configurations provided herein. In the example shown in FIG. 3, the LSB of a BOC(10,5) signal is initially at a first frequency of $f_c$–5.115 MHz, where $f_c$=10.23 MHz, and rotated upward by 10.23 MHz to a second frequency; and the USB of the BOC(10,5) signal is initially at a third frequency of $f_c$+5.115 MHz, and rotated downward by 10.23 MHz to a fourth frequency.

First sideband rotation circuit(s) 110 can be configured to provide the rotated LSB or USB (and optionally the rotated other of the LSB or USB) to interference suppression circuit(s) 120. Interference suppression circuit(s) 120 can be configured so as to receive and to reduce interference in the rotated LSB and/or USB using any suitable circuitry. For example, in configurations in which both the LSB and USB are rotated by first sideband rotation circuit(s) 110, interference suppression circuit(s) 120 can include circuitry respectively configured to receive and reduce interference in the rotated LSB, as well as circuitry respectively configured to receive and reduce interference in the rotated USB. Such circuitry can, but need not necessarily, perform the same interference suppression algorithm on the rotated LSB as on the rotated USB. In some configurations, interference suppression circuit(s) 120 can be configured to reduce the interference signal based on using a linear time domain amplitude filter, based on a non-unity power of the amplitude of the signals, or based on clustering the amplitudes of the signals, e.g., in a manner such as described in U.S. Pat. No. 9,654,158 to Dafesh et al. Any suitable combination of two or more of such techniques can be implemented using interference suppression circuit 120. In some configurations, interference suppression circuit(s) 120 can be configured to reduce the interference signal by implementing algorithms such as described by Amoroso. In some configurations, interference suppression circuit(s) 120 can be configured to reduce the interference signal by implementing algorithms such as described in U.S. Pat. No. 9,197,360 to Wyckoff. In some configurations, interference suppression circuit(s) 120 can be configured to reduce the interference signal based on techniques such as described in U.S. Pat. No. 9,391,654 to Wyckoff et al. In some configurations, interference suppression circuit(s) 120 can be configured to reduce the interference signal by implementing algorithms such as described in Przyjemski et al., "GPS anti jam enhancement techniques," Proceedings of the 49th Annual Meeting of the Institute of Navigation (1993), Jun. 21-23, 1993, Royal Sonesta Hotel, Cambridge, Mass. Other suitable interference suppression algorithms suitably can be implemented using interference suppression circuit(s) 120. Optionally, interference suppression circuit(s) 120 can be configured to filter the rotated LSB and/or USB before applying the interference mitigation algorithm. Such filtering suitably can be fixed or can be adaptive, so as to improve performance and reduce overall loss.

In the configuration illustrated in FIG. 2A, optional second sideband rotation circuit(s) 110 respectively are coupled to interference suppression circuit(s) 120 and are configured to and to rotate the LSB or USB from which interference has been reduced from the second frequency to the first frequency. For example, the rotated LSB from which interference has been reduced can be at a second frequency such as baseband frequency $f_c$, and can be rotated downwards to a first frequency such as $f_{LSB}=f_c-f_{sc}$ using suitable analog or digital circuitry such as described with reference to first sideband rotation circuit(s) 110. Or, for example, the USB can be at a second frequency such as baseband frequency $f_c$, and can be rotated upwards to a first frequency such as $f_{USB}=f_c+f_{sc}$ using suitable analog or digital circuitry such as described with reference to first sideband rotation circuit(s) 110. In some configurations, second sideband rotation circuit(s) 130 include a plurality of sideband rotation circuits, e.g., a circuit for rotating LSB from a second frequency (such as $f_c$) to a first frequency (such as $f_{LSB}$) and another circuit for rotating LSB from a fourth frequency (such as $f_c$) to a third frequency (such as $f_{USB}$). The second and fourth frequencies can be, but need not necessarily be, the same as one another. In the example shown in FIG. 3, after interference reduction, the LSB of the BOC(10,5) signal is rotated downward by 10.23 MHz to the first frequency of $f_c-5.115$ MHz; and the USB of the BOC(10,5) signal is rotated upward by 10.23 MHz to a fourth frequency of $f_c+5.115$ MHz.

Optional signal construction circuit 140 is configured to receive the rotated LSB or USB, from which interference has been reduced, from each of second sideband rotation circuit(s) 130 and, based thereon, to construct a signal that includes the desired BOC signal with reduced contribution from the interference signal as compared to the signal received by antenna/analog conditioner 11. For example, in some configurations, optional signal construction circuit 140 can be configured to receive the rotated LSB and USB from which interference has been reduced, and to combine those signals together to generate a BOC signal with reduced interference. In other configurations, an output can be coupled to interference suppression circuit(s) 120 and configured to generate a BOC signal with reduced interference based on the rotated LSB or USB at the second or fourth frequency from which interference has been reduced, and optional sideband rotation circuit(s) 130 and signal construction circuit 140 can be omitted. In still other configurations, an output can be coupled to optional sideband rotation circuit(s) 130 and configured to generate a BOC signal with reduced interference based on the rotated LSB or USB at the first or third frequency from which interference has been reduced, and signal construction circuit 140 can be omitted.

Signal processor 13 can be configured so as to receive the output from interference reduction circuit 100, e.g., from interference suppression circuit(s) 120 or from optional signal construction circuit 140, and can be configured so to extract and utilize the desired BOC signal from such output, which includes reduced contribution from the interference signal.

Note that optional A/D converter 12, first sideband rotation circuit(s) 110, interference suppression circuit(s) 120, optional second sideband rotation circuit(s) 130, and optional signal construction circuit 140 can be implemented using any suitable circuits or components known in the art. For example, hardware circuits for performing A/D conversion are readily commercially available. As another example, first sideband rotation circuit(s) 110, interference suppression circuit(s) 120, optional second sideband rotation circuit(s) 130, and optional signal construction circuit 140 can be implemented using any suitable combination of arithmetic circuits that are known in the art for arithmetically operating on analog or digital signals (e.g., BR filter, FIR filter, subtractor, adder, multiplier, divider, or the like). Any such analog or digital hardware components suitably can be coupled together with any suitable paths, such as conductive elements or non-conductive elements. Other circuits could be employed in the analog or digital domain including comparators or envelope detectors, as is known to one skilled in the art. In other configurations, the functionalities of one or more of optional A/D converter 12, first sideband rotation circuit(s) 110, interference suppression circuit 120, and optional signal construction circuit 140 can be provided by a suitably programmed field-programmable gate array (FPGA), application-specific integrated circuit (ASIC). FPGAs and ASICs are commercially available, and methods of programming same to achieve desired logical programming are known in the art. In still other configurations, the functionalities of one or more of optional A/D converter 12, first sideband rotation circuit(s) 110, interference suppression circuit(s) 120, optional second sideband rotation circuit(s) 130, and optional signal construction circuit 140 can be provided by a suitably programmed computer, e.g., a personal computer including a processor and a non-transitory computer-readable medium storing instructions to cause the processor to perform the steps of the present methods or to implement the functionality of the present circuits. Alternatively, the processor can include a digital processor, such as a central processing unit (CPU) or graphics processor unit (GPU), or an analog processor. Additionally, note that circuitry other than first sideband rotation circuit(s) 110, interference suppression circuit(s) 120, optional second sideband rotation circuit(s) 130, and optional signal construction circuit 140 can be used to provide interference reduction circuit 100 with functionality analogous to that described herein.

Figure 2B:
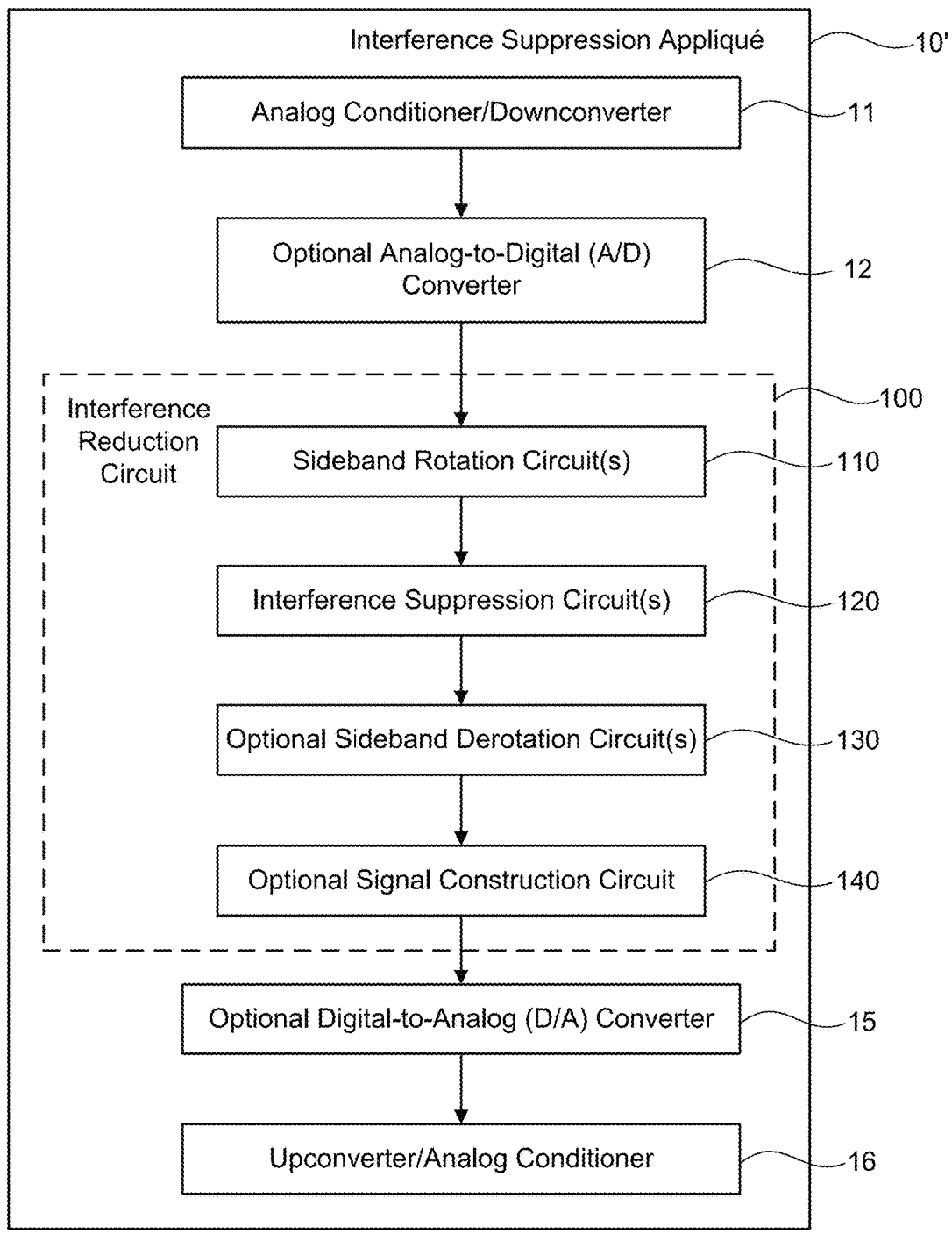
FIG. 2B schematically illustrates a circuit for reducing an interference signal that spectrally overlaps a desired BOC signal in an interference suppression appliqué, according to some configurations provided herein.

In an alternative configuration, FIG. 2B schematically illustrates a circuit for reducing an interference signal that spectrally overlaps a desired BOC signal in an interference suppression appliqué, according to some configurations provided herein. Interference suppression appliqué 10' illustrated in FIG. 2B includes some similar components as receiver 10 illustrated in FIG. 2A. Interference suppression appliqué 10' includes analog conditioner/downconverter 11; optional A/D converter 12 which can be configured similarly as optional A/D converter 12 described above with reference to FIG. 2A; first sideband rotation circuit(s) 110 which can be configured similarly as first sideband rotation circuit(s) 110 described above with reference to FIG. 2A; interference suppression circuit(s) 120 which can be configured similarly as interference suppression circuit(s) 120 described above with reference to FIG. 2A; optional second sideband rotation circuit(s) 130 which can be configured similarly as optional second sideband rotation circuit(s) 130 described above with reference to FIG. 2A; optional signal construction circuit 140 which can be configured similarly as signal construction circuit 140 described above with reference to FIG. 2A; optional digital-to-analog (D/A) converter 15; and upconverter/analog conditioner 26. In alternative configurations, a second interference reduction circuit may be present before or after the first interference reduction circuit. For example, a narrow band frequency excision circuit may process the signal before the interference reduction circuit shown in FIG. 2A. In some embodiments, the first and/or second interference reduction circuits can be implemented in the same device as the signal processor. In other examples, the first and/or second interference reduction circuits can be implemented in separated devices on a printed circuit board or similar arrangement. Interference suppression appliqué 10' can be inserted between a receiver's antenna and analog conditioner and configured so as to suppress the effects of interference before it reaches an unmodified receiver. For example, interference suppression appliqué 10' can be inserted between a GPS receiver antenna and an unmodified receiver or between a cellular base station antenna and an unmodified receiver. In interference suppression applique 10', interference reduction circuit 100 can be configured to provide its output to digital-to-analog (D/A) converter 15, which is configured to convert the output to the analog domain. Upconverter and analog conditioner 16 are configured to receive the analog output from D/A converter via a suitable path and an input port, and to amplify and upconvert the analog output to an appropriate level expected by an unmodified receiver. As will be recognized by those skilled in the art, upconverter and analog conditioner 16 suitably can include an optional digital-to-analog converter and a frequency up-converter to translate the user signals into an analog RF signal. Appropriate analog conditioner designs for a variety of signals in a variety of contexts, e.g., terrestrial, aircraft, or space-based antennas, are known in the art.

Some exemplary circuits and methods for use in reducing interference in circuits such as described with reference to FIGS. 2A and 2B now will be described.

Figure 4:
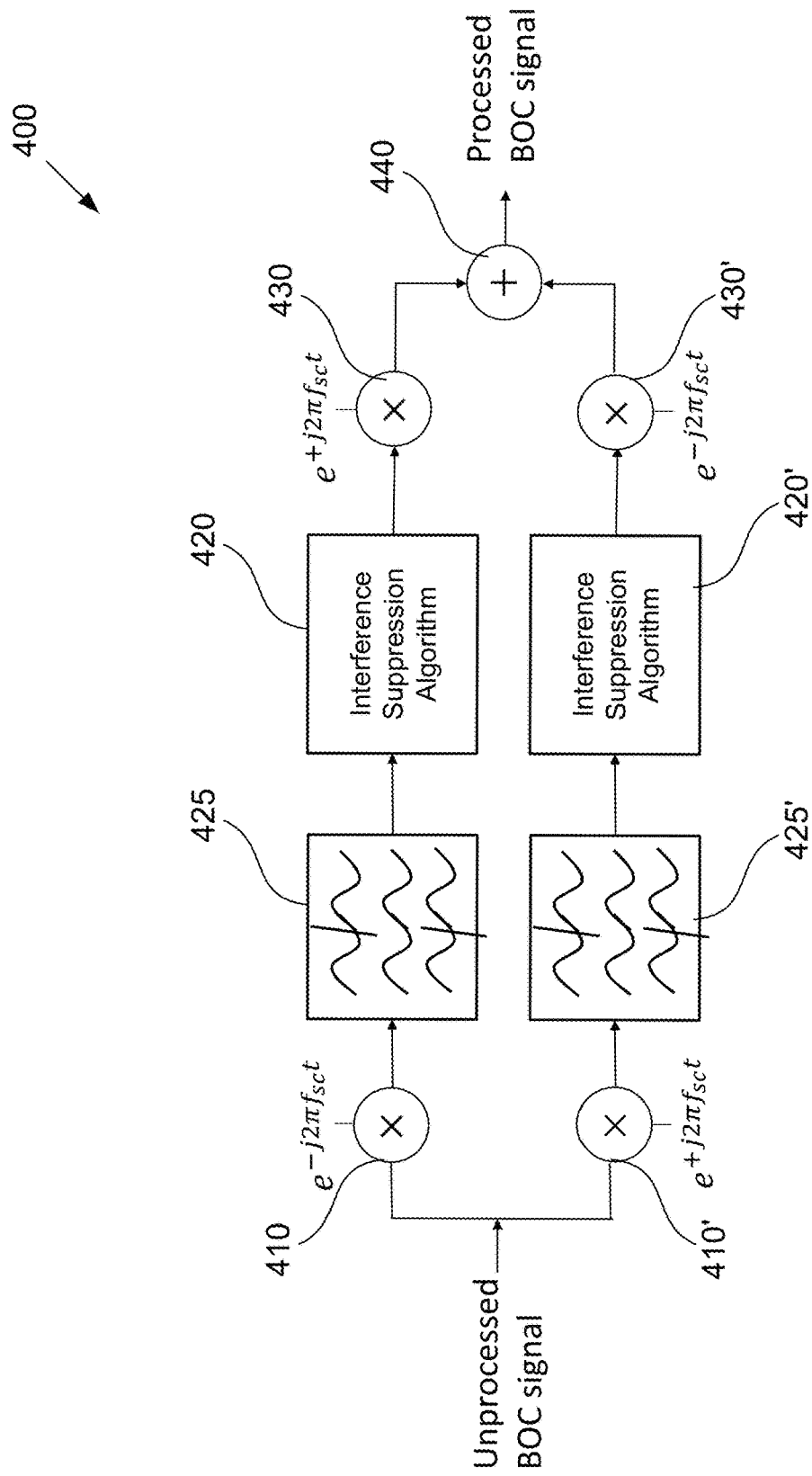
FIG. 4 schematically illustrates another circuit for reducing an interference signal that spectrally overlaps a desired BOC signal in a receiver, according to some configurations provided herein.

FIG. 4 schematically illustrates another circuit for reducing an interference signal that spectrally overlaps a desired BOC signal in a receiver, according to some configurations provided herein. Circuit 400 receives an unprocessed BOC signal, e.g., from an antenna and/or from optional A/D and/or signal conditioning circuitry. Circuit 400 includes first sideband rotation circuit 410 configured to receive and to rotate the LSB of the BOC signal from a first frequency to a second frequency, e.g., by multiplying the LSB by $e^{-2\pi f_{sc} t}$ (where t is time); and second sideband rotation circuit configured to receive and rotate the USB of the BOC signal from a third frequency to a fourth frequency, e.g., by multiplying the USB by $e^{+2\pi f_{sc} t}$. Circuit 400 also includes first interference suppression circuit 420 applying a suitable interference suppression algorithm, optionally including first filter 425, coupled to the first sideband rotation circuit 410 and configured to receive and to reduce interference in the rotated LSB; and second' interference suppression circuit 420 applying a suitable interference suppression algorithm, optionally including second filter 425', coupled to the second sideband rotation circuit 410' and configured to receive and to reduce interference in the rotated USB. Circuit 400 also includes third sideband rotation circuit 430 configured to receive and to rotate the LSB of the BOC signal from the second frequency to the first frequency, e.g., by multiplying the LSB by $e^{+2\pi f_{sc} t}$ after interference suppression; and fourth sideband rotation circuit 430' configured to receive and rotate the USB of the BOC signal from the fourth frequency to the third frequency, e.g., by multiplying the USB by $e^{-2\pi f_{sc} t}$ after interference suppression. Circuit 400 also includes signal construction circuit 400 configured to receive and to combine the LSB and USB, from which interference has been reduced, so as to output a BOC signal with reduced interference.

Figure 5A:
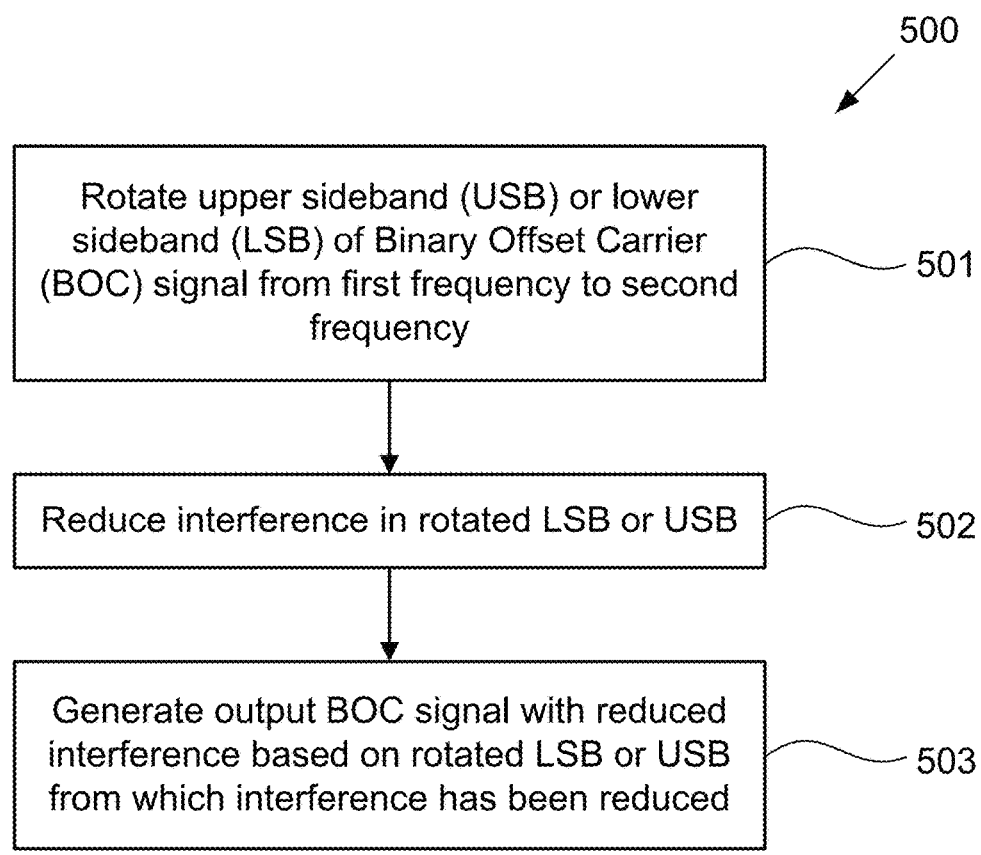
FIGS. 5A-5B illustrate steps in exemplary methods for reducing an interference signal that spectrally overlaps a desired BOC signal, according to some configurations provided herein.
Figure 5B:
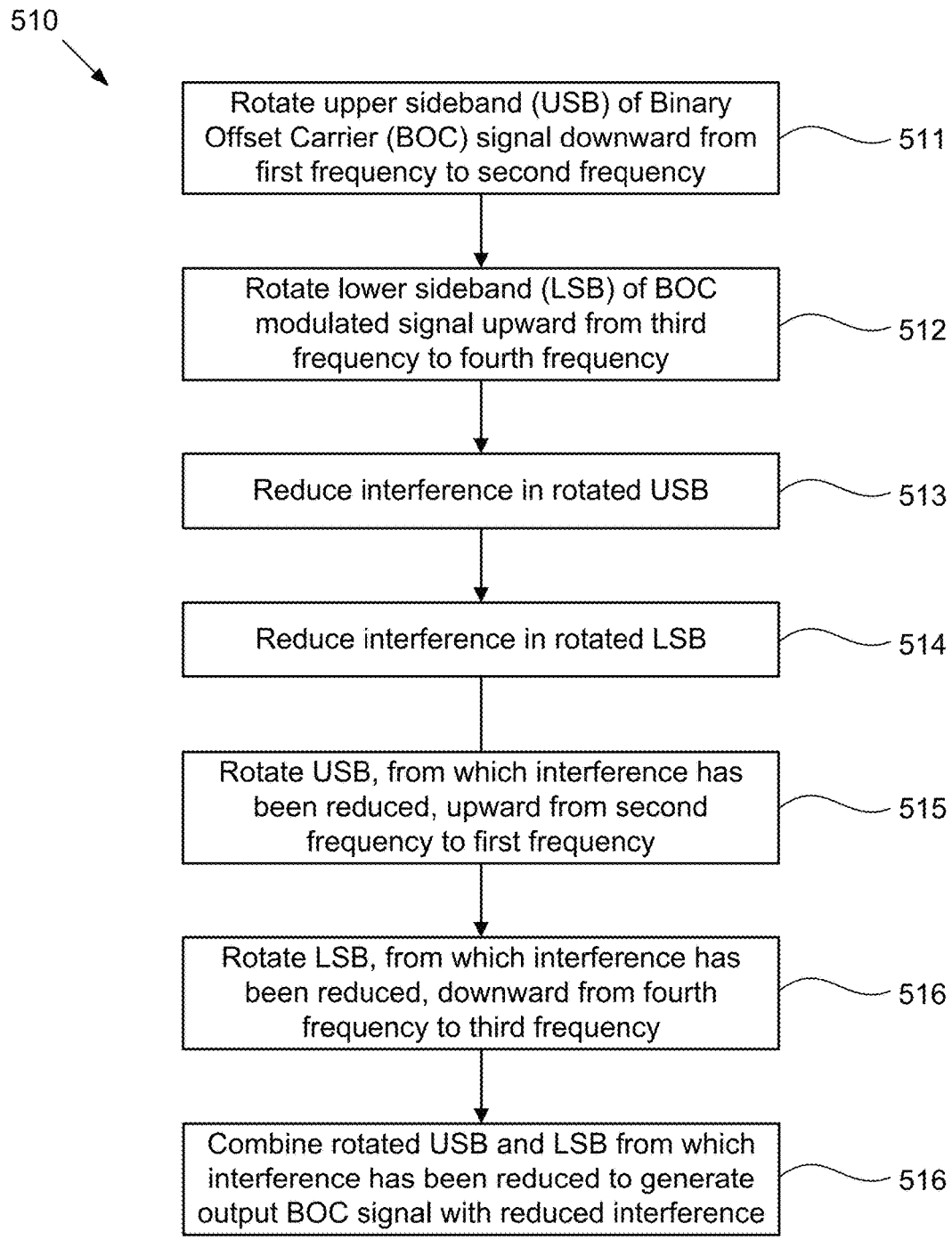

FIGS. 5A-5B illustrate steps in exemplary methods for reducing an interference signal that spectrally overlaps a desired BOC signal, according to some configurations provided herein. The methods illustrated in FIGS. 5A-5B can be, but need not necessarily be, implemented using circuits such as illustrated in FIG. 2A-2B or 4. Method 500 illustrated in FIG. 5A includes rotating the LSB or the USB of a received BOC signal from a first frequency to a second frequency (step 501). For example, first sideband rotation circuit(s) 110 of receiver 10 illustrated in FIG. 2A, or first sideband rotation circuit(s) 110 of appliqué 10 illustrated in FIG. 2A, can be configured to as to rotate the LSB upwards or to rotate the USB downwards, or both, to a respective frequency. Or, for example, first sideband rotation circuit 410 of circuit 400 illustrated in FIG. 4 can be configured so as to rotate the LSB upwards and to rotate the USB downwards. Exemplary initial and rotated frequencies of the LSB and USB are described elsewhere herein. Method 500 illustrated in FIG. 5A also includes reducing interference in the rotated LSB or USB (step 502). For example, any suitable interference suppression algorithm, such as exemplified herein, can be applied to the rotated LSB or USB, such as using interference suppression circuit(s) 120 of receiver 10 illustrated in FIG. 2A, or interference suppression circuit(s) 120 of appliqué 10 illustrated in FIG. 2A. Or, for example, first interference suppression circuit 420 (optionally including filter 425) can reduce interference from the rotated LSB and second interference suppression circuit 420' (optionally including filter 425') can reduce interference from the rotated USB, such as illustrated in FIG. 4.

Referring again to FIG. 5A, method 500 further can include generating an output BOC signal with reduced interference based on the rotated LSB or USB from which interference has been reduced (step 503). For example, interference reduction circuit(s) 120 illustrated in FIG. 2A can provide an output directly to signal processor 13, or can provide the rotated LSB or USB from which interference has been reduced to optional sideband rotation circuit(s) 130 which rotate the LSB or USB and provide the rotated LSB or USB to optional signal construction circuit 140 which generates an output BOC signal, from which interference has been reduced, to signal processor 13. Or, for example, interference reduction circuit(s) 120 illustrated in FIG. 2B can provide an output directly to signal processor 13, or can provide the rotated LSB or USB from which interference has been reduced to optional sideband rotation circuit(s) 130 which rotate the LSB or USB and provide the rotated LSB or USB to optional signal construction circuit 140 which generates an output BOC signal, from which interference has been reduced, to optional D/A converter 15 or to upconverter/analog conditioner 16. Or, for example, first and second interference suppression circuits 420, 420' respectively can provide the rotated LSB and USB to third and fourth sideband rotation circuits 430, 430', which can respectively rotate the LSB and USB back to their initial frequencies and provide such signals to signal construction circuit 440 which generates as output a processed BOC signal.

FIG. 5B illustrates another method 510 for reducing an interference signal that spectrally overlaps a desired BOC signal, according to some configurations provided herein. Method 510 illustrated in FIG. 5B includes rotating the USB of a received BOC signal downward from a first frequency to a second frequency (step 511). For example, first sideband rotation circuit(s) 110 of receiver 10 illustrated in FIG. 2A, or first sideband rotation circuit(s) 110 of appliqué 10 illustrated in FIG. 2A, can be configured to as to rotate the USB downward to a second frequency. Or, for example, second sideband rotation circuit 410' of circuit 400 illustrated in FIG. 4 can be configured so as to rotate the USB downward from a first to a second frequency. Method 510 illustrated in FIG. 5A also includes rotating the LSB of the received BOC signal upward from a third frequency to a fourth frequency (step 512). For example, first sideband rotation circuit(s) 110 of receiver 10 illustrated in FIG. 2A, or first sideband rotation circuit(s) 110 of appliqué 10 illustrated in FIG. 2A, can be configured to as to rotate the LSB upward to a fourth frequency, which optionally can be the same as the second frequency, e.g., can be $f_c$. Or, for example, first sideband rotation circuit 410 of circuit 400 illustrated in FIG. 4 can be configured so as to rotate the LSB downward to a fourth frequency. Exemplary initial and rotated frequencies of the LSB and USB are described elsewhere herein. Steps 511 and 512 can be, but need not necessarily be, performed at the same time as one another.

Method 510 illustrated in FIG. 5B also includes reducing interference in the rotated USB (step 513) and reducing interference in the rotated LSB (step 514). For example, any suitable interference suppression algorithm, such as exemplified herein, respectively can be applied to the rotated LSB and USB, such as using interference suppression circuit(s) 120 of receiver 10 illustrated in FIG. 2A, or interference suppression circuit(s) 120 of appliqué 10 illustrated in FIG. 2A. Or, for example, first interference suppression circuit 420 (optionally including filter 425) can reduce interference from the rotated LSB and second interference suppression circuit 420' (optionally including filter 425') can reduce interference from the rotated USB, such as illustrated in FIG. 4. Steps 513 and 514 can be, but need not necessarily be, performed at the same time as one another. Optionally, the rotated LSB and/or USB signals respectively can be filtered before applying steps 513 and/or 514.

Referring again to FIG. 5B, method 510 further can include rotating the USB, from which interference has been reduced, upward from the second frequency to the first frequency (step 515). For example, interference reduction circuit(s) 120 illustrated in FIG. 2A can provide the rotated USB from which interference has been reduced to optional sideband rotation circuit(s) 130 which rotate the USB, e.g., to its original frequency. Or, for example, interference reduction circuit(s) 120 illustrated in FIG. 2B can provide the rotated USB from which interference has been reduced to optional sideband rotation circuit(s) 130 which rotate the USB, e.g., to its original frequency. Method 510 further can include rotating the LSB, from which interference has been reduced, downward from the fourth frequency to the third frequency (step 516). For example, interference reduction circuit(s) 120 illustrated in FIG. 2A can provide the rotated LSB from which interference has been reduced to optional sideband rotation circuit(s) 130 which rotate the LSB, e.g., to its original frequency. Or, for example, interference reduction circuit(s) 120 illustrated in FIG. 2B can provide the rotated LSB from which interference has been reduced to optional sideband rotation circuit(s) 130 which rotate the LSB, e.g., to its original frequency. Steps 515 and 516 can be, but need not necessarily be, performed at the same time as one another.

Referring again to FIG. 5B, method 510 further can include combining the rotated USB and LSB from which interference has been reduced to generate a BOC signal with reduced interference (step 517). For example, optional signal construction circuit 140 illustrated in FIG. 2A can receive from optional sideband rotation circuit(s) 130 the rotated USB and LSB from which interference has been reduced, and can combine such signals to generate a BOC signal with reduced interference. Or, for example, optional signal construction circuit 140 illustrated in FIG. 2B can receive from optional sideband rotation circuit(s) 130 the rotated USB and LSB from which interference has been reduced, and can combine such signals to generate a BOC signal with reduced interference. Or, for example, signal construction circuit 440 illustrated in FIG. 4 respectively can receive from second and first sideband rotation circuits 430', 430 the rotated USB and LSB from which interference has been reduced, and can combine such signals to generate a BOC signal with reduced interference (referred to in FIG. 4 as a processed BOC signal).

From the foregoing and as further illustrated by the nonlimiting example provided below, configurations of the present circuits and methods can remove or reduce the effects of interference at a high frequency subcarrier by performing interference suppression at the respective center frequency of sidebands of a BOC signal. The unprocessed BOC signal, or portions thereof, corresponding to the baseband I/Q signal after frequency conversion, can be rotated upward and/or downward by the subcarrier frequency/sc. The rotated signal components then can be filtered (e.g., using a fixed or adaptive filter) and an interference suppression algorithm applied. After the interference suppression algorithm is applied, the upper branch can be rotated back up by the subcarrier frequency and the lower branch rotated back down. After these operations, the two rotated and processed components of the BOC signal can be added or otherwise combined to form a processed BOC signal in the I/Q domain.

Figure 6:
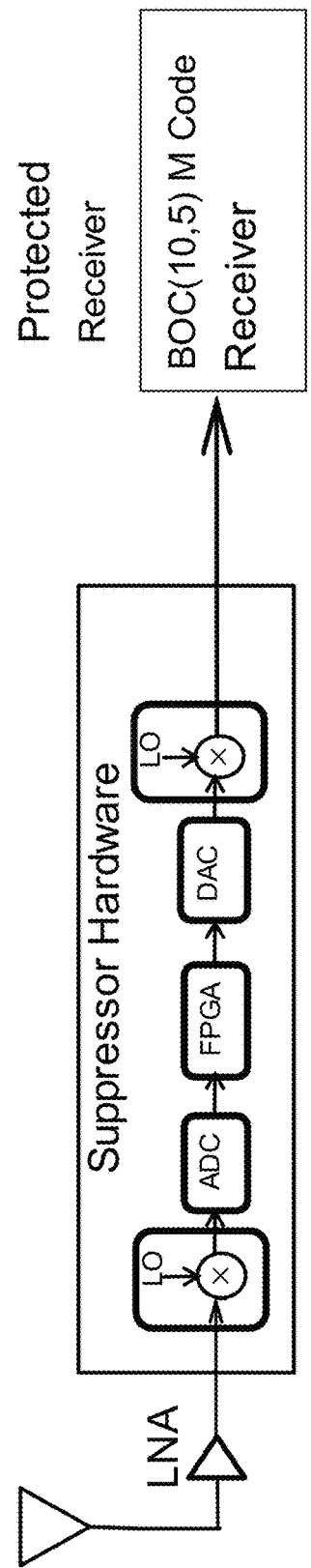
FIG. 6 schematically illustrates selected components of an exemplary appliqué implementation for reducing an interference signal that spectrally overlaps a desired BOC signal in a receiver, according to some configurations provided herein.
Figure 7:
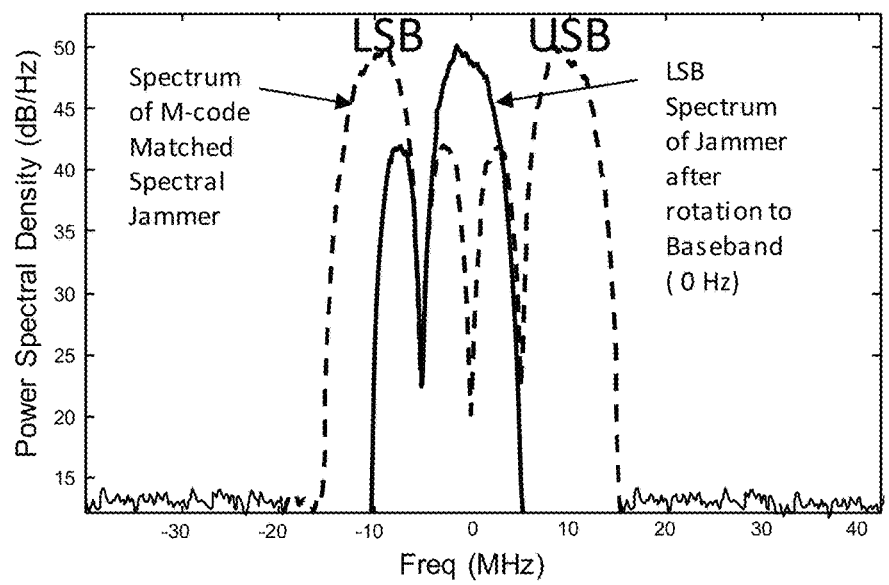
FIG. 7 illustrates the spectrum of an exemplary BOC signal before and after rotation of the signal's USB down to baseband using the appliqué of FIG. 6, according to some configurations provided herein.

An exemplary configuration of the present circuits and methods was implemented using a simulation in MATLAB (MathWorks, Natick, Mass.) and in real time hardware using an FPGA. For example, FIG. 6 schematically illustrates selected components of an exemplary appliqué implementation for reducing an interference signal that spectrally overlaps a desired BOC signal in a receiver, according to some configurations provided herein. The appliqué illustrated in FIG. 6 and used in the present examples included an antenna receiving an unprocessed BOC(10,5) M code signal, low noise amplifier, downconverter using a signal from a local oscillator (LO), analog to digital converter (ADC), FPGA implementing the circuit components illustrated in FIG. 4, digital to analog converter (DAC), and upconverter using the LO signal, and output a processed BOC(10,5) M code signal to a receiver. FIG. 7 illustrates the spectrum of an exemplary BOC signal before and after rotation of the signal's USB down to baseband using the appliqué of FIG. 6, according to some configurations provided herein. FIG. 7 shows the spectrum of the M code signal before and after rotation of the LSB up 10.23 Mhz to baseband at 0 Hz. When this rotation is performed at baseband, 0 Hz represents the carrier frequency (not shown in FIG. 7). The USB may also be rotated down to 0 Hz. In some variation approaches, such rotation processing may be performed at an intermediate frequency or at the carrier frequency.

Figure 8A:
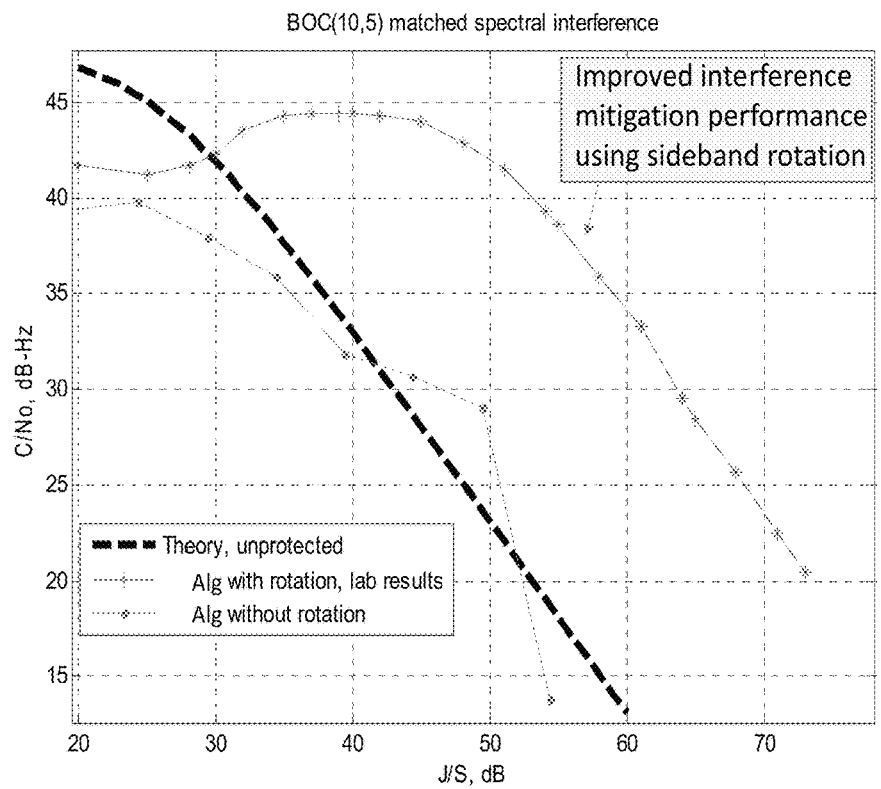
FIGS. 8A-8B illustrate comparisons of a GPS receiver's carrier-to-noise spectral density ratio performance under different matched spectral M code jamming conditions.
Figure 8B:
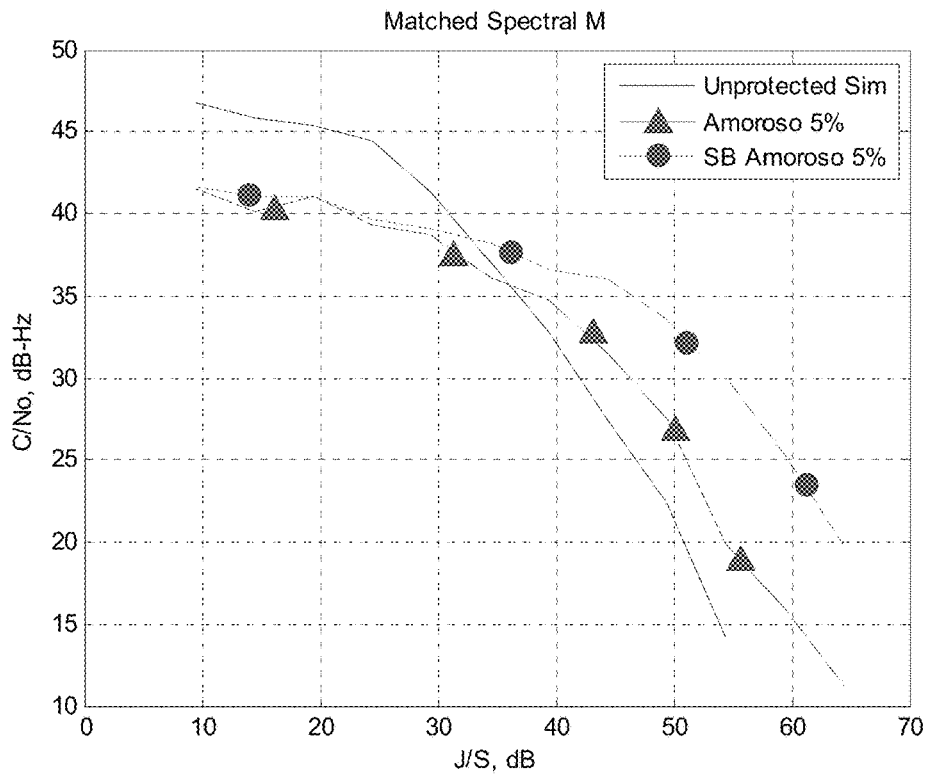

FIGS. 8A-8B illustrate comparisons of a GPS receiver's carrier-to-noise spectral density ratio ($C/N_0$) performance under different matched spectral M code jamming conditions. These jamming conditions can include an unprotected receiver, a received protected by an antijam algorithm without the use of the sideband (SB) rotation, and a receive protected by an antijam algorithm that uses SB rotation. The antijam algorithm is implemented using the apparatus of FIG. 6, with and without the SB rotation. FIGS. 8A-8B also illustrate the $C/N_0$ reported by a GPS receiver as the jammer-to-signal power ration (J/S) is increased for each of these cases.

In FIG. 8A, performance improvement can be observed when the SB rotation algorithm is used in conjunction with the antijam algorithm. Absent the SB rotation algorithm, such performance improvement is not present. In FIG. 8B, the simulated results illustrate approximately a 10 dB performance improvement of the Amoroso algorithm when used with the SB rotation.

While various illustrative embodiments of the invention are described above, it will be apparent to one skilled in the art that various changes and modifications can be made therein without departing from the invention. For example, interference reduction circuit 100 can be configured to work with, and to be coupled to, a pre-existing receiver 10 or interference suppression appliqué 10', but need not necessarily be considered to be an integral part of such a receiver or interference suppression appliqué, and indeed suitably can be used with any circuitry that would benefit from interference reduction. For example, the present interference reduction circuits and methods can be used in military M code GPS receivers or in commercial GPS receivers using civilian or military signals such as the BOC(1,1) signal, the BOC(6,1) signal, or other signal receivers that are in the presence of matched spectral pseudo-random-noise (PRN) code jammers. The invention may generally be applied to all forms of GNSS receivers including multi-GNSS receivers that receive signals from GS, Galileo, or other GNSS satellite navigation systems. Such receivers may be used in cellular phones, infrastructure applications, automobiles, military applications, or the like. The appended claims are intended to cover all such changes and modifications that fall within the true spirit and scope of the invention.

What is claimed:

1. A method for reducing interference in a received Binary Offset Carrier (BOC) signal, the BOC signal comprising an upper sideband (USB) and a lower sideband (LSB), the method comprising:
    rotating the LSB or the USB of the BOC signal from a first frequency to a second frequency;
    reducing interference in the rotated LSB or USB; and
    generating an output BOC signal with reduced interference based on the rotated LSB or USB from which interference has been reduced.

2. The method of claim 1, further comprising rotating the LSB or USB from which interference has been reduced from the second frequency to the first frequency,
    wherein the output BOC signal with reduced interference is generated based on the rotated LSB or USB at the first frequency.

3. The method of claim 1, further comprising:
    rotating the other of the LSB or USB of the BOC signal from a third frequency to a fourth frequency; and
    reducing interference in the rotated other of the LSB or USB,
    wherein the output BOC signal with reduced interference further is generated based on the rotated other of the LSB or USB.

4. The method of claim 3, further comprising:
    rotating the LSB or USB from which interference has been reduced from the second frequency to the first frequency; and
    rotating the other of the LSB or USB from which interference has been reduced from the fourth frequency to the third frequency,
    wherein the output BOC signal with reduced interference is based on a combination of the rotated LSB or USB at the first frequency from which interference has been reduced and the rotated other of the LSB or USB at the third frequency from which interference has been reduced.

5. The method of claim 1, wherein the first and second frequencies differ by a subcarrier frequency of the BOC signal.

6. The method of claim 1, wherein the second frequency is a baseband frequency of the BOC signal.

7. The method of claim 1, wherein reducing interference in the rotated LSB or USB comprises applying an interference mitigation algorithm to the rotated LSB or USB.

8. The method of claim 7, wherein reducing interference in the rotated LSB or USB further comprises filtering the rotated LSB or USB before applying the interference mitigation algorithm.

9. A circuit for reducing interference in a received Binary Offset Carrier (BOC) signal, the BOC signal comprising an upper sideband (USB) and a lower sideband (LSB), the circuit comprising:
    a first sideband rotation circuit configured to receive and to rotate the LSB or the USB of the BOC signal from a first frequency to a second frequency;
    a first interference suppression circuit coupled to the first sideband rotation circuit and configured to receive and to reduce interference in the rotated LSB or USB; and
    an output configured to generate a BOC signal with reduced interference based on the rotated LSB or USB from which interference has been reduced.

10. The circuit of claim 9, further comprising a second sideband rotation circuit configured to receive and rotate the LSB or USB from which interference has been reduced from the second frequency to the first frequency,
    wherein the output is configured to generate the BOC signal with reduced interference based on the rotated LSB or USB at the first frequency.

11. The circuit of claim 9, further comprising:
    a second sideband rotation circuit configured to receive and rotate the other of the LSB or USB of the BOC signal from a third frequency to a fourth frequency; and
    a second interference suppression circuit coupled to the second sideband rotation circuit and configured to receive and to reduce interference in the rotated other of the LSB or USB,
    wherein the output is configured to generate the BOC signal with reduced interference further based on the rotated other of the LSB or USB.

12. The circuit of claim 11, further comprising:
    a third sideband rotation circuit configured to receive and rotate the LSB or USB from which interference has been reduced from the second frequency to the first frequency; and
    a fourth sideband rotation circuit configured to receive and rotate the other of the LSB or USB from which interference has been reduced from the fourth frequency to the third frequency,
    wherein the output is configured to generate the BOC signal with reduced interference further based on a combination of the rotated LSB or USB at the first frequency from which interference has been reduced and the rotated other of the LSB or USB at the third frequency from which interference has been reduced.

13. The circuit of claim 9, wherein the first and second frequencies differ by a subcarrier frequency of the BOC signal.

14. The circuit of claim 9, wherein the second frequency is a baseband frequency of the BOC signal.

15. The circuit of claim 9, wherein the first interference suppression circuit is configured to apply an interference mitigation algorithm to the rotated LSB or USB.

16. The circuit of claim 15, wherein the first interference suppression circuit further is configured to filter the rotated LSB or USB before applying the interference mitigation algorithm.

17. A method for reducing interference in a received Binary Offset Carrier (BOC) signal, the BOC signal comprising an upper sideband (USB) and a lower sideband (LSB), the method comprising:
- rotating the USB of the BOC signal downward from a first frequency to a second frequency;
- rotating the LSB of the BOC signal upward from a third frequency to a fourth frequency;
- reducing interference in the rotated USB;
- reducing interference in the rotated LSB;
- rotating the USB from which interference has been reduced upward from the second frequency to the first frequency;
- rotating the LSB from which interference has been reduced downward from the fourth frequency to the third frequency; and
- combining the rotated USB and LSB from which interference has been reduced to generate an output BOC signal with reduced interference.

18. The method of claim 17, wherein the second frequency and the fourth frequency are a baseband frequency of the BOC signal.

19. A circuit for reducing interference in a received Binary Offset Carrier (BOC) signal, the BOC signal comprising an upper sideband (USB) and a lower sideband (LSB), the circuit comprising:
- a first sideband rotation circuit configured to receive and to rotate the USB of the BOC signal downward from a first frequency to a second frequency;
- a second sideband rotation circuit configured to receive and to rotate the LSB of the BOC signal upward from a third frequency to a fourth frequency;
- a first interference suppression circuit coupled to the first sideband rotation circuit and configured to receive and to reduce interference in the rotated USB;
- a second interference suppression circuit coupled to the second sideband rotation circuit and configured to receive and to reduce interference in the rotated LSB;
- a third sideband rotation circuit coupled to the first interference suppression circuit and configured to receive and to rotate the USB from which interference has been reduced upward from the second frequency to the first frequency;
- a fourth sideband rotation circuit coupled to the second interference suppression circuit and configured to receive and to rotate the LSB from which interference has been reduced downward from the fourth frequency to the third frequency; and
- a signal construction circuit coupled to the third and fourth sideband rotation circuits and configured to receive and combine the rotated USB and LSB from which interference has been reduced to generate an output BOC signal with reduced interference.

20. The circuit of claim 19, wherein the second frequency and the fourth frequency are a baseband frequency of the BOC signal.

\* \* \* \* \*